May 25, 1937.  W. M. PIATT  2,081,382
SEWAGE AERATION
Filed Nov. 21, 1933  2 Sheets—Sheet 1
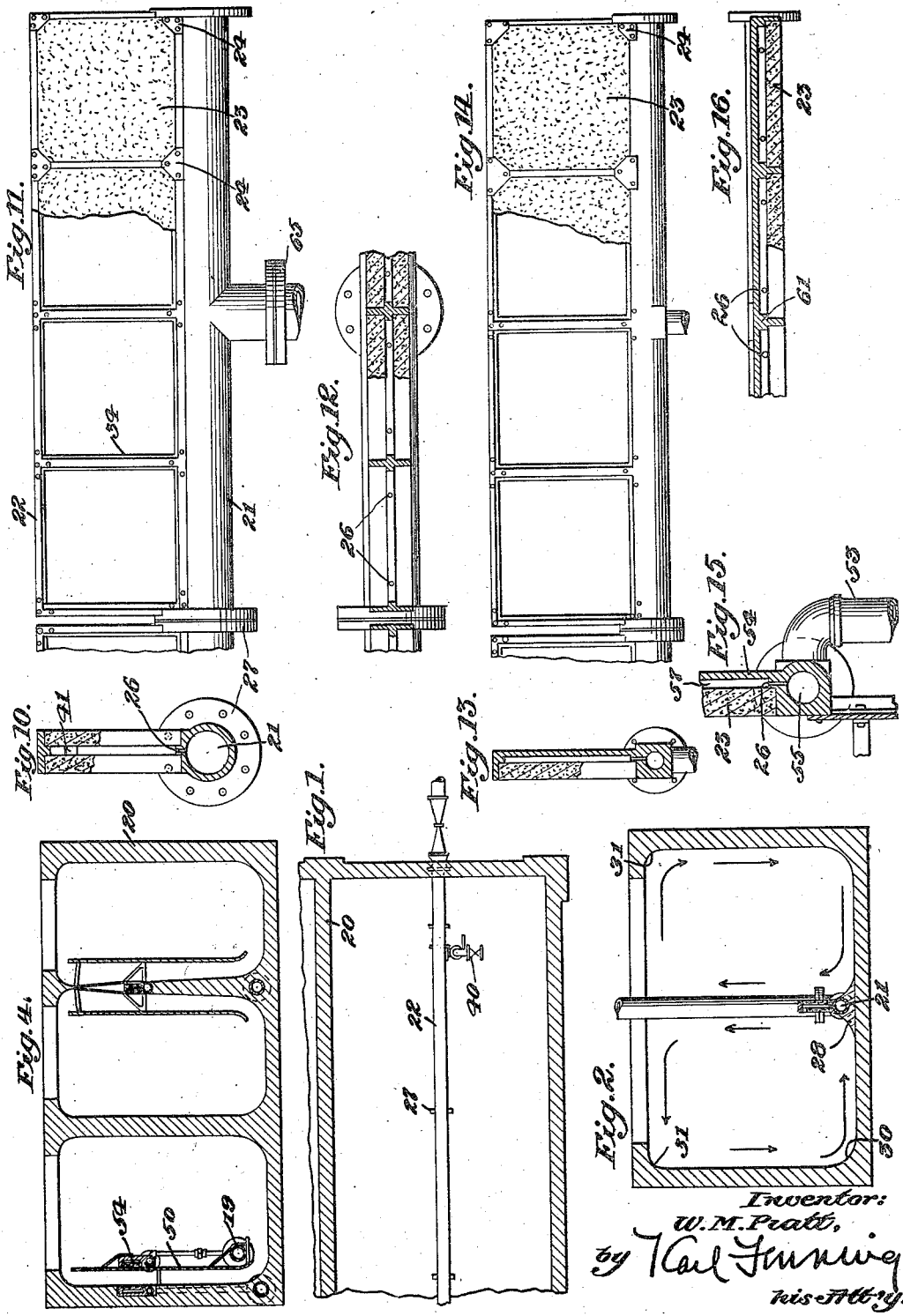
Inventor:
W. M. Piatt,
by Carl Fenning
his Atty.

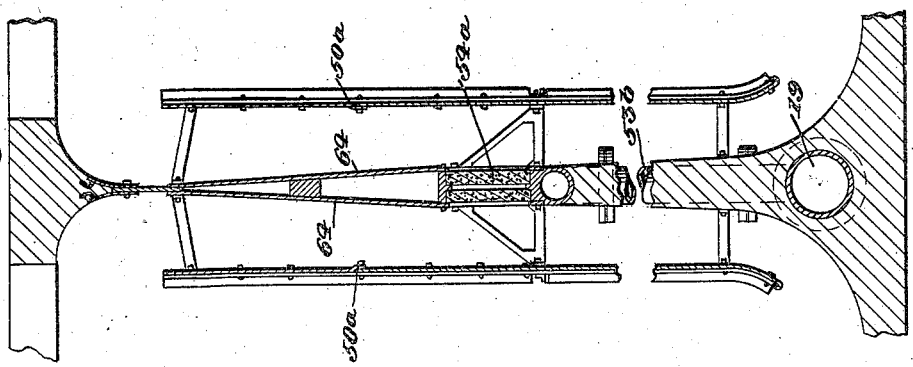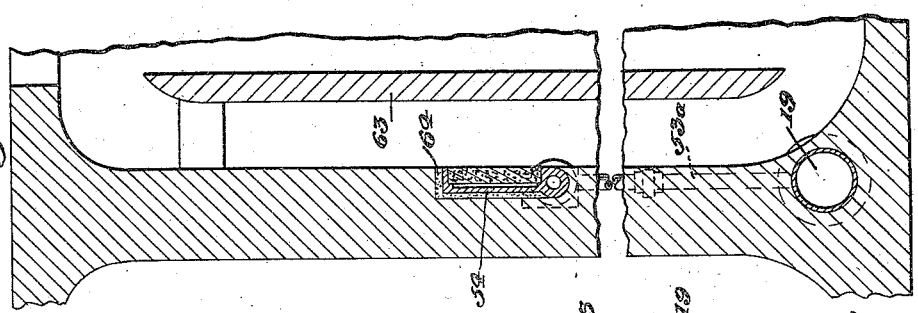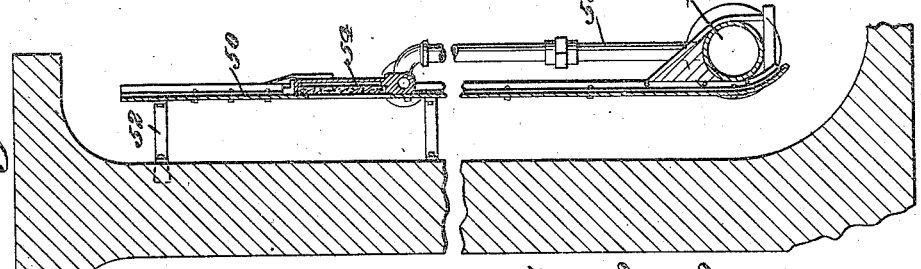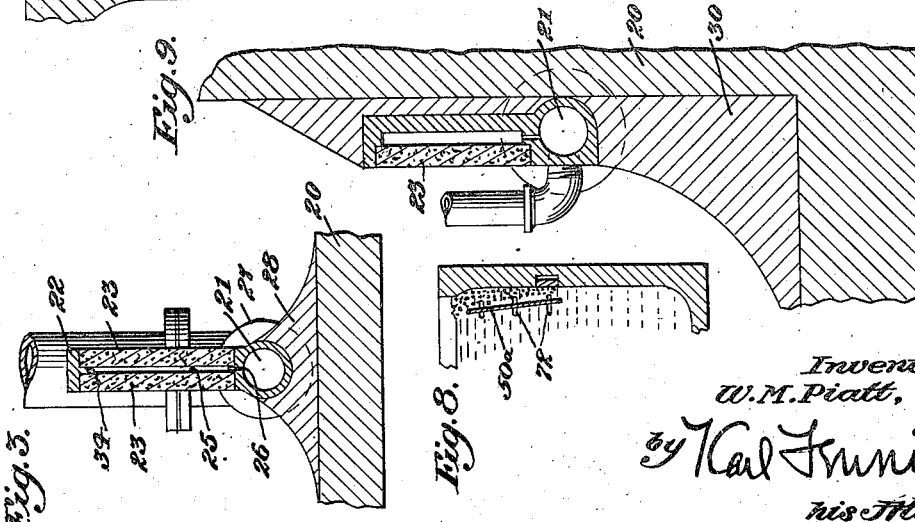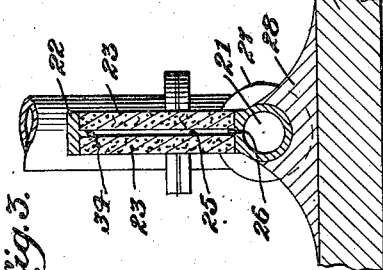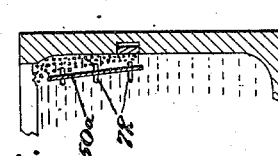

Patented May 25, 1937

2,081,382

UNITED STATES PATENT OFFICE 2,081,382

SEWAGE AERATION

William M. Piatt, Durham, N. C.

Application November 21, 1933, Serial No. 699,079

4 Claims. (Cl. 210—3)

While not entirely confined thereto, the present invention relates particularly to aeration in the activated sludge treatment of sewage. This method of sewage treatment employs a tank through which the sewage is passed and in which it is mixed with previously activated sludge and subjected to the action of bacteria. In some instances before being admitted to the treatment tanks sewage is separated from such mechanically carried materials as stone, sand, gravel, glass, pieces of metal etc., as well as the settleable organic solids. This preliminary treatment is merely a separation process and while it may remove organic matter which otherwise might need treatment, has no technical effect upon the condition of the remaining sewage itself and in certain instances may be entirely omitted. The treatment of the sewage itself is usually carried out in large tanks which may be from ten to twenty times as long as they are wide. An inlet for sewage may be provided at one end and an outlet at the other end so that there is a continuous flow of sewage mixed with activated sludge through the tank. Ordinarily the speed of movement of the sewage through the tank is slow so that the sewage may remain in the tank a sufficient length of time to allow the bacteria to properly act upon the sewage. In order to procure proper action it is essential that the entire body of sewage in the tank be kept in substantially constant movement so as to avoid any settling and separation out of heavier or more solid particles. Such a separation or settling may result in a souring of the sewage interfering with the proper bacterial action and requiring cessation of activities to clean and restart the plant. A purpose, therefore, of the present invention is to provide a sewage treatment tank in which the sewage may be constantly kept in motion so as to prevent settlement and to keep the heavier solid portions in suspension and constantly distributed where they will be subjected to bacterial action.

Oxygen seems to be necessary to support the bacterial action and a purpose of the present invention is to make it possible for the sewage to receive and absorb from the air as much oxygen as may be necessary to support the bacterial action.

Adaptations of the invention are illustrated in the accompanying drawings in which Figure 1 is a horizontal sectional view through the walls of a sewage treatment tank showing a preferred mode of aeration. Fig. 2 is a transverse vertical section of the aeration tank illustrated in Fig. 1, and Fig. 3 is an enlarged transverse vertical fragmentary section of the aeration mechanism illustrated in Fig. 2. Fig. 4 is a transverse vertical section through a plurality of tanks showing other aeration mechanisms. Figs. 5, 6, and 7 are fragmentary transverse sections on an enlarged scale showing the aeration mechanisms illustrated in Fig. 4. Fig. 8 is a transverse vertical fragmentary section showing an optional arrangement of mechanisms associated for aeration. Fig. 9 is a transverse vertical fragmentary section illustrating an optional location of the aeration mechanism, and Figs. 10, 11, 12, 13, 14, 15, and 16, are detailed views of portions of aeration mechanisms.

There is illustrated a tank 20 which may be of any suitable proportions but in practical installations is usually much longer than it is wide and as indicated in Fig. 2 may be slightly wider than it is deep. The tank may have smooth side walls and a smooth bottom wall. Longitudinally along the center of the bottom wall may be laid the aeration mechanism which as more clearly illustrated in Fig. 3 will comprise an air inlet pipe 21 surmounted by a frame 22. As indicated in Fig. 11 the frame 22 may consist of a series of panels each adapted to receive a porous plate 23 preferably of the particular composition and construction herein described. The plates 23 fit into the sockets in the frame 22 and may be set therein in a thin sealing layer of any suitable material and may be held therein by suitable clips or plates 24 fastened by bolts, screws or other suitable means to the frame 22. Ridges 34 on the frame 22 keep the oppositely disposed plates 23 from contact with each other and form between the plates a chamber 25 which may be connected with the pipe 21 at suitable points by tubes 26 two of which are shown at each plate. These might be replaced by a slot more or less continuous throughout the length of the unit. Preferably the pipe 21, frame 22, ridges 34 and tubes 26 may form part of a single casting which for convenience of manufacture, transportation, installation and manipulation may be made in sections of any suitable or preferred length and be provided at the ends with flanges 27 for engagement with and attachment to an adjoining section. In Figs. 11 and 14 of the drawings, sections long enough to carry four porous plates are illustrated but the exact number of plates in any section is immaterial for the present invention. In order to prevent sewage from collecting and souring about or below the pipe 21, I provide, along both sides of the pipe at the bottom of the tank, a filling 26 of concrete or other suitable material which may be poured at the same time the tank 20 is poured or may be placed in position afterward and closely engage the pipe 21. The specific construction or arrangement illustrated is preferred but not essential. It will be observed that the porous plates are arranged vertically on opposite sides of the air chamber 25 and that air goes to a plurality of such plates from the pipe 21 which is provided with air under suitable pressure to pass through the porous plates 23 and provide oxygen for the sewage and also cause it to circulate in two paths, one on the right hand and one on the left hand side of the tank as indicated by arrows in Fig. 2. The quantity and pressure of air admitted will be sufficient to supply oxygen to support the putrefying action of the bacteria and also to keep the entire content of the tank in circulation so that settlement or souring will be prevented. The air pressure will preferably be regulated to cause the moving sewage to sweep across the bottom of the tank with sufficient energy to prevent settling of any of the heavier portions onto the floor of the tank.

In prior practice the aerating devices when plates are employed have been placed in a horizontal position in the tank and in order to procure uniformity of air inlet throughout the length of the tank it has been necessary to bring in separate air inlet pipes to individual porous plates or when a plurality of porous plates have been fed from a single air inlet pipe there have been placed valves in the individual feeders for the individual plates or the channels going to the plates furthest from the source of pressure have been made larger than the channels going to the plates nearer the source of pressure. Such an arrangement has been found necessary in order to adjust the quantity of air fed to each section and so insure an even distribution of air throughout the aeration chamber. I have discovered, however, that by making the air box as illustrated in the drawings with an air chamber having an air outlet into the sewage comprising a porous face plate 23, substantially automatic even distribution of the air throughout the entire length of the air box may be effected. Instead of employing a metallic perforated plate at the air inlet face 23 a porous plate of suitable structure may be employed. One type of satisfactory face plate for such purposes may consist of a block of a rigid, porous mineral substance composed essentially of silica which may be referred to as an artificial porous stone The entire block is preferably of substantially uniform porosity, the structural conditions being analogous to a mass of capillary tubes, which tubes take a tortuous rather than a direct path through the block. The block is a mass of communicating pores and not a mass of sealed or closed cells. The result is that there is a tendency of the material to absorb liquid by capillary attraction and the vertically arranged porous face plate 23 when set into the sewage with no pressure behind it tends to fill its capillary structure with liquid which may pass through to some extent and enter the air chamber. The block nevertheless has a very low resistance to air pressure. While the volume of air passing through the block appears to be directly proportional to the pressure when the plates are dry, when the plates are water saturated, this does not seem to hold true, probably because the water in the plates is gradually forced out of the pores. It has been discovered then that when a long air box running from end to end of the sewage tank is made up of vertically arranged blocks of this substantially uniform porous artificial stone, variation in air inlet connections and adjustable cocks are not necessary. The air box seems to more or less automatically adjust itself and with any fixed air pressure there is a substantially uniform outlet or distribution into the sewage throughout the length of the box. An increase in pressure does not cause the increase in air outlet at some points alone but is more or less evenly distributed through the entire length of the air box. Apparently at first the air exudes through the pores along the top of the face plates and as more air is needed and the pressure is increased, the air exudes progressively down the plates and more or less uniformly through the length of the box. Such an arrangement is extremely economical and is highly desirable since it allows of the introduction of air at a single point or at a small number of points without the intermediation of more or less complicated regulating machinery or devices.

The tanks commonly used in the activated sludge process in moderate size plants have a ratio of length to width from ten to twenty with a length of travel frequently of several hundred feet in the passage of the liquid through the tank. It will be readily seen from the problem here presented and solved that the conditions obtaining in a tank of this sort are radically different in every way from tanks that may be used in the other arts in which it is desired to maintain a circulation of any sort. In very long tanks such as are ordinarily used in sewage treatment plants the more serious consideration is a proper distribution of the air so as to maintain a uniform circulation throughout the tank and to prevent dead spots. It is common practice in order to very finely divide the air to diffuse the air into the liquid through porous plates placed in the bottom of the tank at the lowest point. One of the characteristics of such porous plates is that removed from the liquid and in a dry state they will pass air very freely with a minute loss of head when air is passed at several times the rate ordinarily used in sewage treatment. These plates, however, when submerged become filled with the water from the liquid which closes the pores of the plate. In forcing air through plates under this condition it is characteristic of the plates that as the quantity of air being forced through the plate is increased, the pores in the plate are easily freed of their moisture content and a considerable increase in the amount of air passed through an individual plate will result in very little increase in the loss of head through the plate over that existing when a lower rate of air is passed through the plate. This might be compared to an orifice which would automatically open up as a greater amount of air is passed through it. This condition is a very unstable and sensitive one. Growths form on the plates tending to close the pores and if the plates were placed horizontally at the bottom of the tank inert materials such as sand would tend to blanket the plates and, unless an unnecessarily high rate of air is maintained, the plates would become clogged and all of the air would pass out through those plates which have not been clogged. This condition becomes exceedingly aggravated when any attempt is made under these conditions to reduce the amount of air being admitted to any one tank. The dead spots are in the bottom of the tank where they cannot be located or seen but where organic matter accumulates and, in the usual absence of a proper supply of oxygen, putrefies and upsets or destroys the entire process. This can be overcome in part by increasing the density of the plate and a proper distribution in any event can only be obtained together with stability of operation by sacrificing some head. By employing a proper porous face properly arranged for letting in air the system is stabilized and the reduction in the quantity of air used is practicable. The result of this practice is that not only a large saving is effected in the amount of power required but there is also a great improvement in the operation of the process as a whole. Further than this when the aerators consist of flat vertically disposed porous plates at no time either when the process is in operation or when it is interrupted are there any precipitated deposits on the diffusers with consequent clogging of the outlets. Where perforated pipes or other devices are used for the dissemination of the air into the liquid, it is still necessary and desirable to control the distribution of the air.

The expedient has been adopted and indicated of curving the lower corner of the tank as indicated at 30. The upper corner of the tank on one or both sides may also be curved as indicated at 31. These and other details are refinements not essential to the main features of the invention but which may be desirable and may under appropriate conditions aid the efficiency of the device.

The inlet of air preferably will be provided through boxes such as described as having porous faces. When these faces are arranged as indicated and set in a vertical direction, they will be self-cleaned as, even when operation is stopped, no sewage will settle upon and clog them. It may, however, be desired to use other forms of air inlet and their exclusion is not contemplated in all phases of the invention.
For carrying out the aeration and especially for insertion in tanks already constructed it may be desirable to employ some such arrangements as shown in Figures 7 to 16. In Fig. 7 is shown a sheet iron baffle 50 suitably supported, for instance, by bars 52 and carrying at its lower edge the main air inlet pipe 19 from which rises the pipe 53 going to the air distribution unit 54 carried in the baffle 50. As illustrated in Fig. 15 the pipe 53 enters the side of the unit 54 which has an air channel 55 in its base communicating through vertical inlets 26 with the air chamber 57 lying behind the porous plates 23 as illustrated in Figs. 15 and 16. The unit 54 may consist of a connection provided with flanges 27 at its ends for connection with adjoining units. The unit 54 may be cast so as to hold a suitable number of porous air transmitting plates 23. The number of these plates in a unit is not essential to the present invention, but four are illustrated. The porous plates 23 rest upon supports 61 leaving behind them the air channel 57. They may be sealed about their edges by a suitable material impervious to air. Behind the plates entering the air channel 57 are inlets 26 as illustrated.
Two of these inlets are provided in association with each porous plate or set of porous plates and air may enter both or may enter one while liquid is running out the other. The porous plates 23 are held on their seats 61 by means of surface plates 24 suitably held for instance by bolts tapped into the casing 54. When it is desired to employ the units 54 in the wall of a tank the arrangement indicated in Fig. 5 may be suitable. With the arrangement any suitable baffle may be employed, a cement baffle 63 being illustrated. In Fig. 5 the unit 54 is supplied with air from the main supply pipe 19 which may be embedded in the bottom of the wall through a vertical pipe 53a, also embedded in the wall and entering the bottom of the unit 54. As a matter of convenience the unit 54 may be embedded and held in the wall of the tank by means of cement or other adhesive or other filling material 64. In Fig. 6 is shown an arrangement of doublefaced units. The air inlet pipe 19 embedded in the base of the tank is connected with upright pipes 53b entering the units 54a which may be supported by the pipes 53b and also surmounted by plates 64 extending to the top of the tank. This structure makes a definite partition in the tank. At each side thereof may be supported baffles 50a, here illustrated as of sheet iron or of other suitable material. The units 54a are illustrated in detail in Figs. 11 to 13 where it will be seen connection is provided for the pipe 53b by means of flanges 27 so that air may be let into the pipe or air chamber 21 from which air passages 26 rise to the air chamber 25 provided between the oppositely disposed seats on the ridges 34 so arranged that the porous plates 23 may rest on the oppositely disposed seats and form opposite side walls to the chamber 25 being held in place by suitable means such as the plates 24.

As illustrated at 41 in Fig. 10, it may be desirable to have holes or passageways through the bars 34 and 61 preferably toward their tops so as to allow inter-communication for air under pressure.

In Fig. 4 the devices of Figs. 5, 6, and 7 are shown in place in tanks. It will be understood that the aerators in both wall and baffle as shown at the left of Fig. 4 need not be used together but in any specific installation one or the other may be omitted.

The specific arrangement for supporting or holding the various arrangements here described is not essential to the invention, but illustrates practical embodiments thereof.

In Figs. 4 to 9 the air inlet device has been indicated as built into the wall or partition but this obviously is not essential and any of the other arrangements might be applied. The purpose of this is to let in air between the wall and partition and the baffle and this might be done by placing the air inlet box or pipe in or on the wall or the partition or baffle or suspending it between the baffle and the wall or partition.

It will be noted that the air inlet pipe is illustrated as below the porous outlet face. When the apparatus is shut down or the air pressure ceases liquid seeps through the porous plates and may fill the air pipes and the space within the frame behind the porous plates. If the air inlet pipe were entirely above the plates it would be necessary to force all the liquid through the porous plates at starting and this would be a slow process and might last long enough at some points to allow sewage to sour. By the construction shown the liquid settles into the pipe which is below the plates and when air pressure is established the liquid may be blown out through the blow off valve 40. The liquid in the frame behind the porous plate will continue to sink into the pipe and go off through the valve 40. This will give a quick starting and allow air to go through the porous plate into the sewage. The drainage is facilitated by the plurality of channels 26 as air may go up through some of these while liquid is still coming down through others.

All the baffles may be adjustable in angle and to and from the side wall and to each other and thus the width of the up-rising sewage channel and its sections as well as the opening between the baffles may be changed or adjusted to suit conditions. Such adjusting means may be of any suitable type. In Fig. 8 the baffle 50a is shown mounted adjustably in slots 72. As indicated in that figure, the increase in cross section toward the top of the channel for aerated sewage need not be great due to the small amount of air present with the amount of liquid passing through the device, nevertheless, it may be desirable to provide for the expansion occurring as the pressure in the compressed air is released and it rises carrying sewage up with it. In the drawings the outward inclination of the baffles may be somewhat exaggerated but the actual position will be dictated by results desired or procured in actual practice.

The effect of inclining the baffle may in a way be accomplished as shown in Fig. 6 by inclining the upper plates 64 of the wall or partition by which arrangement also the upper portion of the channel through which passes the aerated sewage is larger than the lower portion of the channel.

In Fig. 9 is shown an arrangement by which the porous plates 23 may be applied to a tank already constructed by embedding them and their air inlet pipe 21 in cement or other plastic material placed at a lower corner of one of the side walls of the tank 20. This arrangement may be used either with or without an associated baffle.

It will be understood that the baffles when used will not reach to the bottom of the tank and will stop below the level of the sewage so that circulation will go about them both at top and bottom.

The invention is not confined to the specific forms, proportions or assemblages of apparatus illustrated, as changes therein may suggest themselves to be made when installing and operating in accordance with the engineering experience, ingenuity and ability of those dealing with sewage.

I claim as my invention:

1. In a sewage treatment tank, means for admitting air under pressure to the sewage comprising a chamber containing air under pressure and a plurality of vertically disposed porous air inletting plates in communication with the chamber, the plates being arranged at substantially the same depth below the sewage level and of substantially uniform porosity and of a structure analogous to a mass of capillary tubes taking a tortuous rather than a direct path through the plates so that there will be automatically substantially equal air distribution through all the plates.

2. In a sewage treatment tank, means for admitting air under pressure to the sewage comprising a plurality of vertically disposed porous air inletting plates, and a single chamber containing air under pressure in communication with the vertical plates, the plates being of substantially uniform porosity and of a structure analogous to a mass of capillary tubes taking a tortuous rather than a direct path through the plates so that there will be automatically substantially equal air distribution through all the plates.

3. In a sewage treatment tank, means for admitting air under pressure to the sewage comprising a series of vertically disposed porous air inletting plates extending substantially throughout the length of the tank, and a single chamber containing air under pressure in communication with the vertical plates the plates being of substantially uniform porosity and of a structure analogous to a mass of capillary tubes taking a tortuous rather than a direct path through the plates so that there will be automatically substantially uniform air distribution throughout the length of the tank.

4. In a sewage treatment tank, means for admitting air under pressure to the sewage comprising a chamber extending substantially the length of the tank containing air under pressure, and in communication with the chamber a vertically disposed longitudinally extended face extending a material length longitudinally of the tank below the top level of the sewage of substantially uniform porosity and of a structure analogous to a mass of capillary tubes taking a tortuous rather than a direct path through the walls so that there will be automatically substantially uniform air distribution throughout the length of the face.

WM. M. PIATT.